United States Patent
Fernandez Alonso et al.

(10) Patent No.: US 11,457,359 B2
(45) Date of Patent: Sep. 27, 2022

(54) USER DATA TRANSPORTED OVER NON-ACCESS STRATUM

(71) Applicant: Telefonaktiebolaget LM Ericsson (publ), Stockholm (SE)

(72) Inventors: Susana Fernandez Alonso, Madrid (ES); Fuencisla Garcia Azorero, Madrid (ES); Angel Navas Cornejo, Leganes (ES); Ignacio Rivas Molina, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 139 days.

(21) Appl. No.: 16/622,797

(22) PCT Filed: Jul. 6, 2017

(86) PCT No.: PCT/EP2017/067043
§ 371 (c)(1),
(2) Date: Dec. 13, 2019

(87) PCT Pub. No.: WO2019/007525
PCT Pub. Date: Jan. 10, 2019

(65) Prior Publication Data
US 2021/0153018 A1    May 20, 2021

(51) Int. Cl.
*H04W 12/08* (2021.01)
*H04W 28/06* (2009.01)

(52) U.S. Cl.
CPC .......... *H04W 12/08* (2013.01); *H04W 28/06* (2013.01)

(58) Field of Classification Search
CPC .... H04W 12/08; H04W 28/06; H04L 41/0893
See application file for complete search history.

(56) References Cited

U.S. PATENT DOCUMENTS

| 2018/0227302 A1* | 8/2018 | Lee | ............ H04W 12/0431 |
| 2018/0227743 A1* | 8/2018 | Faccin | ............ H04W 76/10 |

OTHER PUBLICATIONS

S2-171904: "Update of APN rate control to support small date allowance plans", 3GPP Draft;_CR23401_APN_Rate_Control_Options_V1.1, 3rd Generation Partnership Project (3GPP), Mobile Competence Centre ; 650, Route Des Lucioles ; F-06921 Sophia-Antipolis Cedex ; France, vol. SA WG2, No. Busan, South Korea; Mar. 27, 2017-Mar. 26, 2017 (Mar. 26, 2017), XP051247641; consisting of 52 pages.

(Continued)

*Primary Examiner* — Kabir A Timory
(74) *Attorney, Agent, or Firm* — Christopher & Weisberg, P.A.

(57) ABSTRACT

Methods and apparatus for controlling the transmission of user data over an NAS of a telecommunications network. An AMF includes a receiver configured to receive NAS policy control data determined by a PCF. The NAS policy control data identifies a user, is based on the user's subscription to the telecommunications network and includes one or more authorization parameters identifying whether the user is permitted to transmit user data over the NAS. The receiver also receives from a UE, or an AS, an NAS transmission request identifying the user and requesting transmission of user data over the NAS. An NAS transmission authorizer controls whether the transmission of the user data over the NAS should be authorized based on the authorization parameters and the NAS transmission request.

32 Claims, 4 Drawing Sheets

(56) References Cited

OTHER PUBLICATIONS (Release 15)"3rd Generation Partnership Project; Technical Specification Group Services and System Aspects; General Packet Radio Service (GPRS) enhancements for Evolved Universal Terrestrial Radio Access Network (E-UTRAN) access", 3GPP Draft; 23401-F00_From_E40_With_CR3234R3_CRS_Implemented, 3rd Generation Partnership Project (3GPP); F-06921 Sophia-Antipolis Cedex ; France, Jun. 12, 2017 (Jun. 12, 2017), XP051334830; consisting of 71 pages.

S2-160972; Ericsson: "Introduction of Control Plane CIoT EPS optimization", 3GPP Draft, _WAS0909 CP Optimization Intro, 3rd Generation Partnership Project (3GPP), Mobile Competence Centre ; 650, Route Des Lucioles ; F-06921 Sophia-Antipolis Cedex; France, vol. SA WG2, No. Sophia Antipolis, France; 222 Feb. 2016 (Feb. 22, 2016), XP051077963; consisting of 28 pages.

C3-161074; Ericsson: "Support for rate control of CIoT data", 3GPP Draft; Rate_CTRL_213_R13, 3rd Generation Partnership Project (3GPP), Mobile Competence Centre ; 650, Route Des Lucioles ; F-06921 Sophia-Antipolis Cedex ; France, vol. CT WG3, No. Osaka;May 16, 2016 (May 16, 2016), XP051097478; consisting of 6 pages.

S2-163058; Qualcomm Incorporated et al: "Simultaneous support for CP and UP optimisation", 3GPP Draft; 23401_CR2995R8_CIOT_(REL-13) S2-162058-23 401 CR CIOT Simultaneous Support CP and UP-R7, 3rd Generation Partnership Project (3GPP), Mobile Competence Centre; Nanjing, P.R. China; Jun. 12, 2016 (Jun. 12, 2016), XP051110272; consisting of 34 pages.

International Search Report and Written Opinion of the International Searching Authority dated Mar. 1, 2018 issued in PCT Application No. PCT/EP2017/067043 , consisting of 13 pages.

* cited by examiner

USER DATA TRANSPORTED OVER NON-ACCESS STRATUM

CROSS-REFERENCE TO RELATED APPLICATIONS

This application is a Submission Under 35 U.S.C. § 371 for U.S. National Stage Patent Application of International Application Number: PCT/EP2017/067043, filed Jul. 6, 2017 entitled "USER DATA TRANSPORTED OVER NON-ACCESS STRATUM," the entirety of which is incorporated herein by reference.

TECHNICAL FIELD

The invention relates to control of user data transported over the Non-Access Stratum (NAS) of a telecommunications network, in particular a Third Generation Partnership Project (3GPP) network. In particular, the invention relates to authorization and/or rate control of user data transported over the NAS.

BACKGROUND

A policy framework for Fifth Generation (5G) networks is specified in 3GPP Technical Specification (TS) 23.501 V1.0.0. The policy framework functionality comprises the functions of a Policy Control Function (PCF), an Access and Mobility Policy Enforcement Function (AMPEF), an Online Charging System (OCS) and an Application Function (AF).

FIG. 1 shows the policy framework architecture (non-roaming) in a 5G system, which is based on the current Policy Control and Charging (PCC) framework as defined for the Enhanced Packet Core (EPC) in 3GPP TS 23.203 v14.3.0.

The policy framework architecture for 5G networks provides charging and policy control for packet data flows exchanged over a user plane between a User Equipment (UE) and a User Plane Function (UPF), neither of which is shown in FIG. 1. The UPF interacts with a Session Management Function (SMF) 100 via an N4 interface that is not part of the policy framework architecture. The UPF also provides access and mobility policy control for the UE accessing the 5G network.

The PCF 102 provides policy rules to a Policy Control Enforcement Function (PCEF), which is distributed between the SMF 100 and the UPF and includes both charging and policy control information for detected traffic. The SMF 100 may send related instructions towards the UE so that the UE can apply Quality of Service (QoS) control to an uplink (UL) user plane as instructed by the PCF 102.

Additionally, the PCF 102 provides access and mobility policies and UE policies to an Access and Mobility Function (AMF) 104 for enforcement in the AMF 104, Radio Access Network (RAN) or UE.

Access and mobility policies refer to Service Area Restrictions and Radio Access Technology (RAT)/Frequency Selection Priority (RFSP) indicators. Service Area Restrictions indicate areas where the UE is permitted (or not permitted) to initiate a communication session with the network. RAT/RFSP allows a RAN to redirect UEs to different frequency layers or RATs. Enforcement of these policies is typically performed in the RAN. 3GPP TS 23.501, clause 5.3.4.1.1 specifies these mobility restrictions, and annex A.4.1.2 specifies the related procedure.

UE policies refer to access network discovery and selection policies (for the UE to select a non-3GPP access and for the traffic to be routed on that access) and UE Route Selection policies (for the UE to decide how the outgoing traffic should be routed).

These access and mobility policies and UE policies do not apply to user data sent via the NAS transport.

In 3GPP Release 13, as part of the Cellular Internet of Things (CIoT) functionality, it was agreed to introduce Control Plane CIoT Evolved Packet System (EPS) Optimization procedures. The UE and AS can transfer data over the NAS Packet Data Units (PDUs) for both Internet Protocol (IP) and Non-IP data types.

This solution makes sense for the cases where the establishment of resources for the transport of user data over the user plane can be avoided. This possibility simplifies the architecture, limiting the number of involved entities and optimizing the resources.

In order to control CIoT application traffic, 3GPP has defined a user data rate control mechanism for network traffic sent from/to a UE in the CIoT EPS Optimization scenarios mentioned above. Two procedures are defined: Serving Public Land Mobile Network (PLMN) rate control (see clause 4.7.7.1 in 3GPP TS 23.401); and Access Point name (APN) rate control (see clause 4.7.7.2 in 3GPP TS 23.401).

According to these procedures the network may control the number of messages sent to/from a UE within the PLMN (Serving PLMN rate control) or per APN (APN rate control).

APN rate control is controlled by the Service Capability Exposure Function (SCEF)/Packet Gateway (PGW) based on the configuration for both UL and DL messages. Serving PLMN rate control is controlled by the Mobility Management Entity (MME) and the SCEF/PGW configuration is determined in the MME and transported to the SCEF/PGW.

SUMMARY

The APN Rate Control and Serving PLMN Rate Control were designed in 4G to protect the network from overload in case of massive communications, especially when Control Plane data (NAS transport) is used. However, the inventors have appreciated that they are not useful for providing different subscription based data package plans and protecting from certain peak load situations.

It has been considered to transmit different kinds of payload types over NAS (e.g. Session Management (SM) signalling, Short Messaging Service (SMS) etc.). For example, one proposal is that when a UE needs to transmit a payload over the NAS, the UE creates an NAS Transport message indicating Payload Type (e.g. SMS, SM signalling), additional forwarding information, if needed, and the actual Payload. In this environment, the protection from certain peak load situations becomes more important.

Although only SMS & SM signalling is currently being discussed, the inventors have appreciated that the same solution (NAS transport) can be used when a UE and/or Application Server (AS) wants to exchange a small amount of data that does not require that the network establish the conditions for the user plane to be exchanged. These scenarios may not be limited to massive Internet of Things (IoT) cases. Instead individual UEs may run applications that make use of these mechanisms to exchange relevant data.

The inventors have appreciated that there is no dynamic and/or user based authorization and/or rate control for transmission of network traffic over the NAS.

There is no Policy and Charging Rules Function (PCRF) involvement defined in 3GPP when user data is transported using NAS protocol as user data transport protocol, for example over the Control Plane. The inventors have further appreciated that a motivation for not defining dynamic rate control of traffic over the NAS is that IoT scenarios defined in 3GPP Release 13 were considered scenarios focused on the support of massive "things" that transport very small amounts of data. Having a dynamic, user based authorization and/or rate policy would have been considered unnecessary at that time under those conditions. It is noted that when a UE (or user) stays below its APN rate control limit, it may still consume its whole daily allowance in just a few seconds, and this would be unnoticeable by the network in time to react.

Considering the current mechanisms defined for 4G, any UE (or user) can send and/or receive any amount of data over the NAS that does not surpass the configured rate control values, regardless of whether it is a fraudulent user, an abuser, or of the user's data plan in the user's subscription.

In addition, a network operator cannot take any specific action on such a user (e.g. redirect the traffic to a less optimized route, force the UE to transport over User Plane for Application traffic, use a different RAT type or RFSP index, or disregard the exceeded traffic until a new period is initiated) if the allowed rate is surpassed in a specific time or under certain conditions. Controlling the allowed rate on a user basis and/or dynamically would help alleviate the peak load on the network and/or prevent the load becoming significant—if there is a large number of devices, potentially accessing in a time-synchronized manner, the peak load on the network may be high.

Also, the operator cannot authorize different payloads depending on the UE (user) subscription and specific conditions (e.g. SMS could be authorized only when the UE is in a certain location or area).

Finally, there is no mechanism to ingest data in the payload that can help the application in identifying specific treatment in the network.

Exemplary methods and apparatus disclosed herein are aimed at solving or at least mitigating one or more of the above problems, although other problems may also be solved.

According to an aspect of the invention, there is provided a network node for use as an Access Mobility Function, AMF, for controlling the transmission of user data over a non-Access Stratum, NAS, of a telecommunications network. The network node comprises a receiver, which may be a receiving means, configured to receive NAS policy control data from a Policy Control Function, PCF, the NAS policy control data identifying a user, being based on the user's subscription to the telecommunications network and comprising one or more authorization parameters identifying whether the user is permitted to transmit user data over the NAS. The receiver is further configured to receive from a User Equipment, UE, or an Application Server, AS, an NAS transmission request identifying the user and requesting transmission of user data over the NAS. The apparatus further comprises an NAS transmission authorizer, which may be an NAS transmission authorizing means, configured to control whether the transmission of the user data over the NAS should be authorized based on the authorization parameters and the NAS transmission request.

Optionally, the authorization parameters comprise one or more of: whether the user is permitted to transmit user data over the NAS; one or more payload types that the user is permitted to transmit over the NAS; an authorized rate at which the user may transmit the user data over the NAS; and a maximum number of authorized requests for the user.

Optionally, the NAS transmission request comprises data identifying a payload type to be transmitted, the NAS transmission authorizer being configured to authorize the request if the identified payload type is one of the one or more payload types in the authorization parameters.

Optionally, the authorization parameters comprise the authorized rate at which the user may transmit the user data over the NAS, the network node may further comprise an NAS transmission controller configured to control the transmission of the user data over the NAS based on the authorized rate.

Optionally, the authorized rate at which the user may transmit the user data over the NAS is a rate per Data Network Name, DNN, per Public Land Mobile Network, PLMN, and/or per network slice.

Optionally, the authorized rate at which the user may transmit the user data over the NAS comprises an uplink rate and/or a downlink rate.

Optionally, the NAS policy control data further comprises one or more enforcement actions and wherein the NAS transmission authorizer is configured to undertake one or more of the one or more enforcement actions if at least one of the authorization parameters is not met.

Optionally, the NAS policy control data further comprises one or more event triggers identifying one or more events, and the network node further comprises an event controlling means, which may be an event controller, configured to monitor transmission of the user data over the NAS and to control a transmission means, which may be a transmitter, to transmit to the PCF a request for updated NAS policy control data if one of the one or more events occurs.

According to the invention in an aspect, there is provided a method for controlling a network node for use as an Access Mobility Function, AMF, for controlling the transmission of user data over a non-Access Stratum, NAS, of a telecommunications network. The method comprises receiving, by a receiver, NAS policy control data from a Policy Control Function, PCF, the NAS policy control data identifying a user, being based on the user's subscription to the telecommunications network and comprising one or more authorization parameters identifying whether the user is permitted to transmit user data over the NAS. The method comprises receiving, by the receiver from a User Equipment, UE, or an Application Server, AS, an NAS transmission request identifying the user and requesting transmission of user data over the NAS. The method comprises controlling, by an NAS transmission authorizer, whether the transmission of the user data over the NAS should be authorized based on the authorization parameters and the NAS transmission request.

Optionally, the authorization parameters comprise one or more of: whether the user is permitted to transmit user data over the NAS; one or more payload types that the user is permitted to transmit over the NAS; an authorized rate at which the user may transmit the user data over the NAS; and a maximum number of authorized requests for the user.

Optionally, the NAS transmission request comprises data identifying a payload type to be transmitted, the method comprising authorizing, by the NAS transmission authorizer, the request if the identified payload type is one of the one or more payload types in the authorization parameters.

Optionally, the authorization parameters comprise the authorized rate at which the user may transmit the user data over the NAS, the method further comprising controlling, by an NAS transmission controller, the transmission of the user data over the NAS based on the authorized rate.

Optionally, the authorized rate at which the user may transmit the user data over the NAS is a rate per Data Network Name, DNN, per Public Land Mobile Network, PLMN, and/or per network slice.

Optionally, the authorized rate at which the user may transmit the user data over the NAS comprises an uplink rate and/or a downlink rate.

Optionally, the NAS policy control data further comprises one or more enforcement actions and wherein the method further comprises undertaking, by the NAS transmission authorizer, one or more of the one or more enforcement actions if at least one of the authorization parameters is not met.

Optionally, the NAS policy control data further comprises one or more event triggers identifying one or more events, and the method further comprises monitoring, by an event controller, transmission of the user data over the NAS, and controlling, by the event controller, a transmitter to transmit to the PCF a request for updated NAS policy control data if one of the one or more events occurs.

According to the invention in an aspect, there is provided a network node for use as a Policy Control Function, PCF, in a telecommunications network. The network node comprises a receiving means, which may be a receiver, configured to receive from an Access Mobility Function, AMF, a request for NAS policy control data, the request identifying a user of the telecommunications network. The network node comprises an NAS policy data determining means, which may be an NAS policy data determiner, configured to determine the NAS policy control data based on the user's subscription to the telecommunications network, the NAS policy control data identifying the user and comprising one or more authorization parameters identifying whether the user is permitted to transmit user data over a non-Access Stratum, NAS, of the telecommunications network. The NAS policy data determiner is further configured to control a transmitter to transmit the determined NAS policy control data to the AMF.

Optionally, the NAS policy data determiner is further configured to determine the NAS policy control data based on one or more dynamic conditions.

Optionally, the dynamic conditions comprise one or more of: a time at which the user data may be transmitted over the NAS; a Radio Access Technology, RAT, type; and a load on the telecommunications network.

Optionally, the one or more authorization parameters comprise one or more of: whether the user is permitted to transmit user data over the NAS; one or more payload types that the user is permitted to transmit over the NAS; an authorized rate at which the user may transmit the user data over the NAS; and a maximum number of authorized requests for the user.

Optionally, the authorized rate at which the user may transmit the user data over the NAS is a rate per Data Network Name, DNN, per Public Land Mobile Network, PLMN and/or per network slice.

Optionally, the authorized rate at which the user may transmit the user data over the NAS comprises an uplink rate and/or a downlink rate.

Optionally, the NAS policy control data further comprises one or more enforcement actions to be undertaken if at least one of the authorization parameters is not met.

Optionally, the NAS policy control data further comprises one or more event triggers identifying one or more events, and the receiver is configured to receive a request for updated NAS policy control data if one or more of the one or more events occurs, the network node further comprising an NAS policy updating means, which may be an NAS policy updater, configured to determine updated NAS policy control data based on the occurred event, and further configured to control the transmitter to transmit the updated NAS policy control data to the AMF.

According to the invention in an aspect, there is provided a method for controlling a network node for use as a Policy Control Function, PCF, in a telecommunications network. The method comprises receiving, by a receiver from an Access Mobility Function, AMF, a request for NAS policy control data, the request identifying a user of the telecommunications network. The method comprises determining, by a NAS policy data determiner, the NAS policy control data based on the user's subscription to the telecommunications network, the NAS policy control data identifying the user and comprising one or more authorization parameters identifying whether the user is permitted to transmit user data over a non-Access Stratum, NAS, of the telecommunications network. The method comprises controlling, by the NAS policy data determiner, a transmitter to transmit the determined NAS policy control data to the AMF.

Optionally, the method further comprises determining, by the NAS policy data determiner, the NAS policy control data based on one or more dynamic conditions.

Optionally, the dynamic conditions comprise one or more of: a time at which the user data may be transmitted over the NAS; a Radio Access Technology, RAT, type; and a load on the telecommunications network.

Optionally, the one or more authorization parameters comprise one or more of: whether the user is permitted to transmit user data over the NAS; one or more payload types that the user is permitted to transmit over the NAS; an authorized rate at which the user may transmit the user data over the NAS; and a maximum number of authorized requests for the user.

Optionally, the authorized rate at which the user may transmit the user data over the NAS is a rate per Data Network Name, DNN, per Public Land Mobile Network, PLMN and/or per network slice.

Optionally, the authorized rate at which the user may transmit the user data over the NAS comprises an uplink rate and/or a downlink rate.

Optionally, the NAS policy control data further comprises one or more enforcement actions to be undertaken if at least one of the transmission parameters is not met.

Optionally, the NAS policy control data further comprises one or more event triggers identifying one or more events, the method further comprising receiving, by the receiver, a request for updated NAS policy control data if one or more of the one or more events occurs; determining, by an NAS policy updater, updated NAS policy control data based on the occurred event; and controlling, by the NAS policy updater, the transmitter to transmit the updated NAS policy control data to the AMF.

According to the invention in an aspect, there is provided a computer program comprising instructions which, when executed on at least one processor, cause the at least one processor to carry out any method disclosed herein.

According to the invention in an aspect, there is provided a carrier containing the computer program mentioned above, wherein the carrier is one of an electronic signal, optical signal, radio signal, or non-transitory computer readable storage medium.

DETAILED DESCRIPTION

Figure 1:
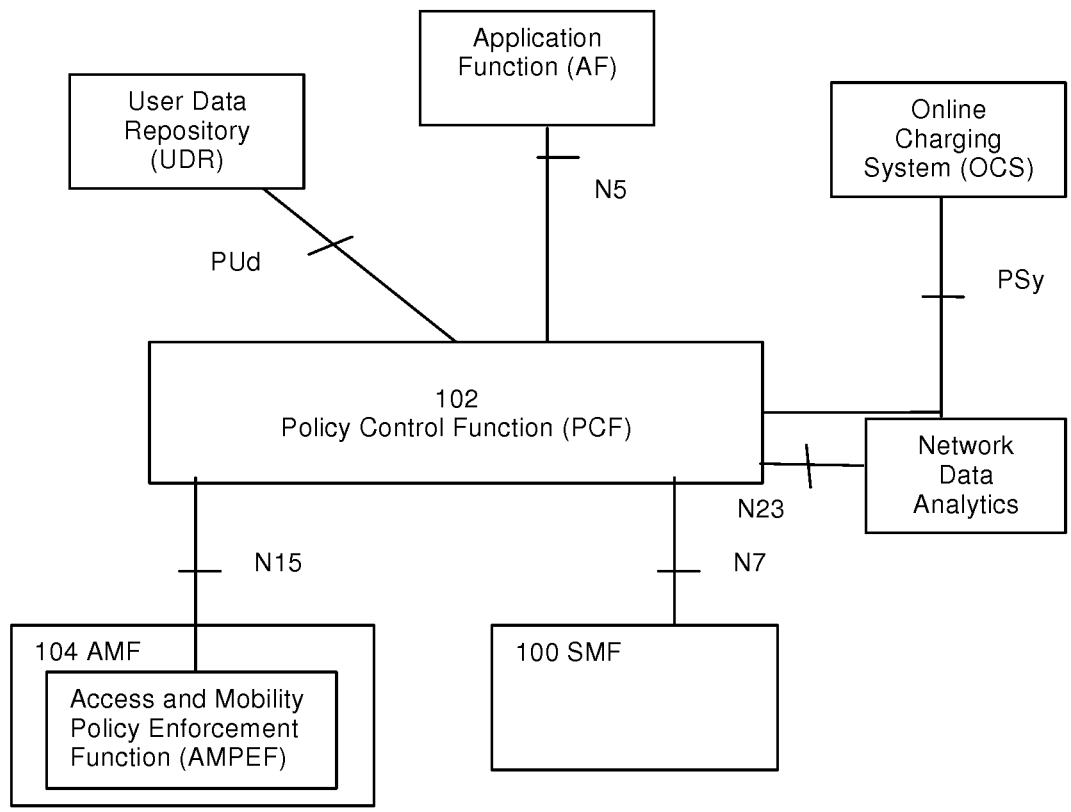
FIG. 1 is a block schematic representation of a PCC architecture in 5G telecommunications networks.

Methods and apparatus disclosed herein provide a network operator the opportunity to control user data transported over the NAS. Operators are therefore able to flexibly monetize on new services, for example, by providing subscription differentiation and/or to protect the network of overload situations.

In exemplary arrangements, the PCF 102 may provide NAS policy control data to the AMF 104. For example, in the NAS policy control data, the PCF may:

- Provide an authorized (deferred/non-deferred) UL/DL rate information, which may be per Data Network Name (DNN), per PLMN or per network slice;
- Provide enforcement actions when a UL/DL rate is reached—e.g. redirect traffic, disregard traffic, change RAT type, change RFSP, contact the PCF, etc.,
- Authorize a user and/or a type of payload that a user can transmit over the NAS based on dynamic conditions;
- Request to ingest data on the payload i.e. to include data given by the PCF, or configured at the AMF, into the payload to be transmitted over NAS;
- Provide a maximum number of authorized requests for a user to transmit user data over the NAS; and
- Provide event triggers to re-authorize any previous decision when dynamic conditions change, for example, network conditions, UE conditions, time conditions, location conditions, load conditions, session conditions and/or others.

When the AMF 104 detects user data transmitted over NAS, it may authorize that traffic according to the NAS policy control data from the PCF 102 and information provided in an NAS transmission request message. Additionally, the AMF 104 may start (e.g. depending on the time conditions) to control the rate at which user data is transported over the NAS and optionally apply any enforcement actions when that rate is exceeded. The AMF 104 can also contact the PCF 102 based on any provisioned event triggers (e.g. by sending a UE Context Modification request) in order to get updated NAS policy control data (e.g., the AMF 104 might notify the UE that the user has reached the maximum number of authorized requests). The new instructions can also indicate if data can be ingested for the detected payload.

Exemplary methods and apparatus may provide one or more of the following advantages:

- Allowing a network operator to identify abusers or users making fraudulent use of the network and to apply actions based on that identification, such as discarding the traffic, blocking the user, etc.;
- Allowing a network operator to apply a selective use of the network for a user dependent on the kind of user, time, location or any other dynamic condition, such as, for example, load conditions;
- Allowing a network operator to authorize the transport of data over the NAS based on dynamic conditions, which might be a user or network parameter, such as subscription type and/or dynamic conditions; and
- Allowing a network operator to have information about the amount of transported user data over the NAS and to size the network properly.

Exemplary methods and apparatus disclosed herein provide NAS policy control data, from the PCF 102 to the AMF 104, identifying how the AMF 104 should handle user data transmitted from the UE over the Control Plane using the NAS protocol as user data transport protocol. This may be done using the N15 interface between the AMF 104 and the PCF 102 and the NAS policy control data may be provided in addition to the current access and mobility policies and UE policies.

In some exemplary arrangements, during a UE registration procedure and as part of a UE Context Establishment Request, the PCF 102 may determine the NAS policy control data related to that UE with regards to the handling of user data in the Control Plane via NAS. In addition to the already defined Access and Mobility Management policies and UE policies transmitted over the N15 reference point to the AMF 104, the PCF 102 may also include the NAS policy control data, which may include authorization parameters that indicate one or more of:

- Whether the user is authorized to send user data over the NAS;
- What kind of payload the user is authorized to send/receive (e.g. SMS, XML files, etc.) over the NAS;
- A maximum number of authorized requests a user may have to send with user data over the NAS;
- One or more enforcement actions when the number of authorized requests is reached (e.g. contact the PCF, discard the traffic, etc.);
- A validity time for the authorization;
- An authorized rate at which user data may be transmitted over the NAS per DNN, PLMN and/or network slice for both UL and DL network traffic;
- One or more enforcement actions when the authorized rate is exceeded (e.g. redirect traffic to a provided/configured address, discard the traffic, contact the PCF 102 etc.); and
- One or more event triggers that may cause the AMF 104 to contact the PCF 102 (e.g. when the UE starts/stops sending traffic, when there has been a location change of the UE, when the number of authorized requests reached, etc.) to obtain updated NAS policy control data.

Figure 2:
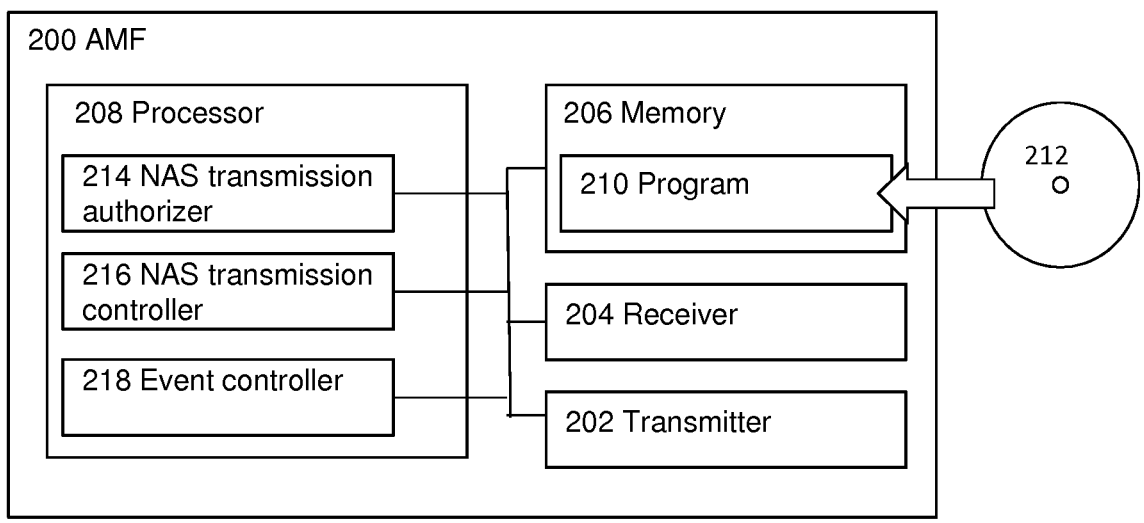
FIG. 2 is a block schematic representation of an AMF.

FIG. 2 shows a schematic representation of a network node 200 for implementing an AMF 104. The network node 200 may be an AMF 104 of FIG. 1. The network node 200 comprises a transmitter 202 and a receiver 204. The transmitter 202 and receiver 204 may be in data communication with other network entities in a telecommunications network and are configured to transmit and receive data accordingly.

The network node 200 further comprises a memory 206 and a processor 208. The memory 206 may comprise a non-volatile memory and/or a volatile memory. The memory 206 may have a computer program 210 stored therein. The computer program 210 may be configured to undertake methods disclosed herein. The computer program 210 may be loaded in the memory 206 from a non-transitory computer readable medium 212, on which the computer program is stored. The processor 208 is configured to undertake one or more of the functions of an NAS transmission authorizer 214, an NAS transmission controller 216 and an event controller 218, as set out below.

Each of the transmitter 202 and receiver 204, memory 206, processor 208, NAS transmission authorizer 214, NAS transmission controller 216 and event controller 218 is in data communication with the other features 202, 204, 206, 208, 210, 214, 216, 218 of the network node 200. The network node 200 can be implemented as a combination of computer hardware and software. In particular, the NAS transmission authorizer 214, NAS transmission controller 216 and event controller 218 may be implemented as software configured to run on the processor 208, or as combinations of hardware and software in separate modules. The memory 206 stores the various programs/executable files that are implemented by a processor 208, and also provides a storage unit for any required data. The programs/ executable files stored in the memory 206, and implemented by the processor 208, can include the NAS transmission authorizer 214, NAS transmission controller 216 and event controller 218, but are not limited to such.

Figure 3:
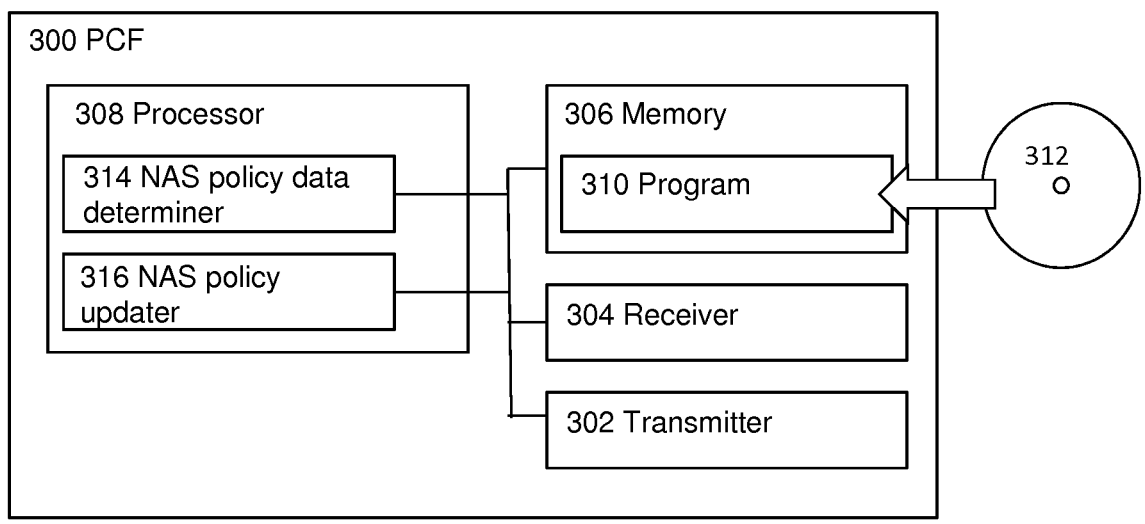
FIG. 3 is a block schematic representation of a PCF.

FIG. 3 shows a schematic representation of a network node 300 for implementing a PCF 102. The network node 300 may be a PCF 102 of FIG. 1. The network node 300 comprises a transmitter 302 and a receiver 304. The transmitter 302 and receiver 304 may be in data communication with other network entities in a telecommunications network and are configured to transmit and receive data accordingly.

The network node 300 further comprises a memory 306 and a processor 308. The memory 306 may comprise a non-volatile memory and/or a volatile memory. The memory 306 may have a computer program 310 stored therein. The computer program 310 may be configured to undertake methods disclosed herein. The computer program 310 may be loaded in the memory 306 from a non-transitory computer readable medium 312, on which the computer program is stored. The processor 308 is configured to undertake one or more of the functions of an NAS policy data determiner 314 and an NAS policy updater 316, as set out below.

Each of the transmitter 302 and receiver 304, memory 306, processor 308, NAS policy data determiner 314 and NAS policy updater 316 is in data communication with the other features 302, 304, 306, 308, 310, 314, 316 of the network node 300. The network node 300 can be implemented as a combination of computer hardware and software. In particular, the NAS policy data determiner 314 and NAS policy updater 316 may be implemented as software configured to run on the processor 308, or as combinations of hardware and software in separate modules. The memory 306 stores the various programs/executable files that are implemented by a processor 308, and also provides a storage unit for any required data. The programs/executable files stored in the memory 306, and implemented by the processor 308, can include the NAS policy data determiner 314 and NAS policy updater 316, but are not limited to such.

Figure 4:
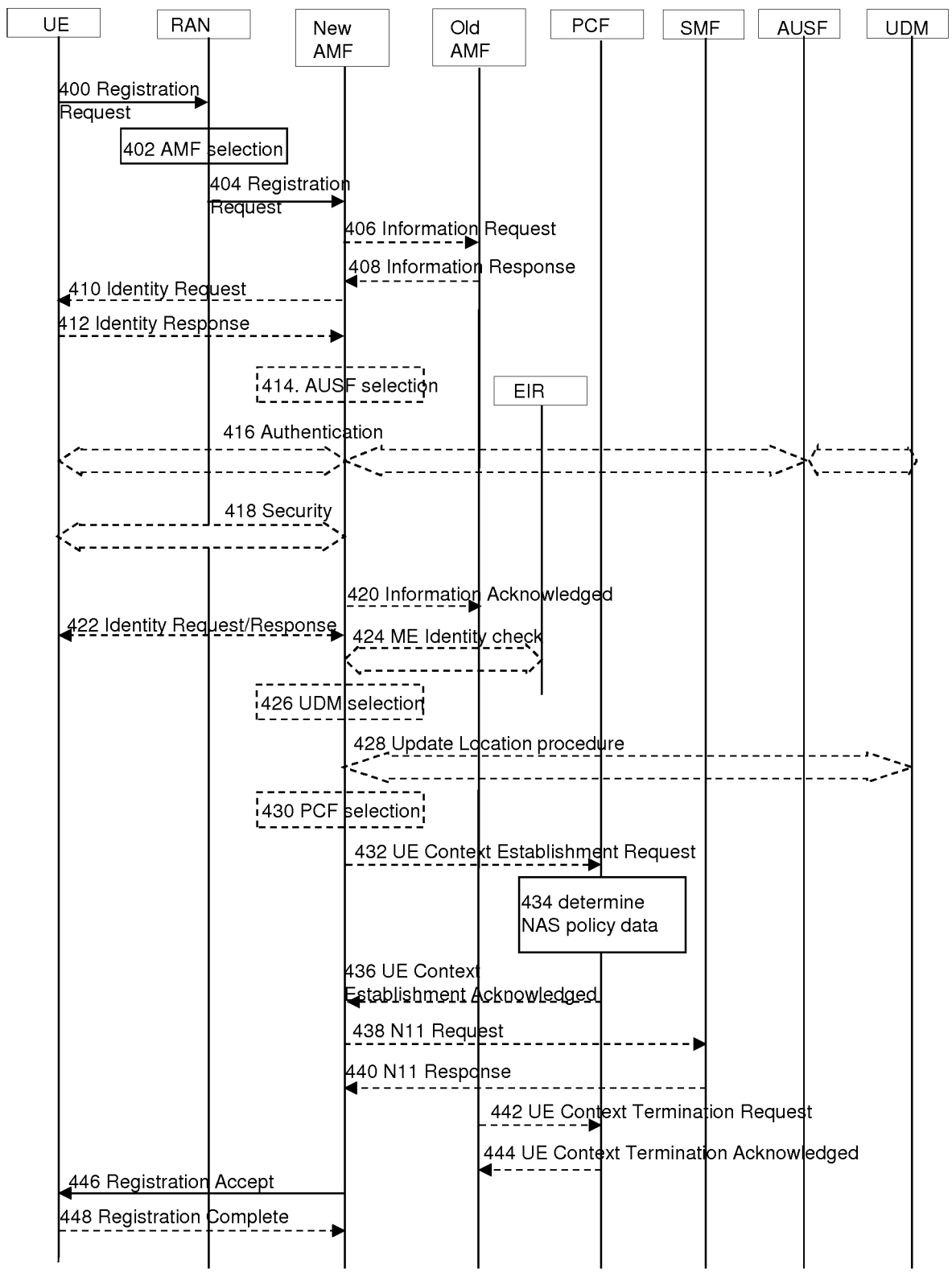
FIG. 4 is a signalling diagram showing registration of a UE in a telecommunications network.

FIG. 4 shows a signaling diagram of a UE registration procedure in which the PCF 102 provides the AMF with the NAS policy control data. In FIG. 4, the PCF 102 transmits to the AMF 104, in addition to the access and mobility management policies and UE policies, NAS policy control data. Once the AMF 104 has received the NAS policy control data, it may begin to monitor any NAS transmission requests from the UE and/or the AS, if applicable.

400 The UE transmits to the RAN an Access Network (AN) message comprising AN parameters and a Registration Request including, e.g., registration type, Subscriber Permanent Identifier (SUPI) or 5G Globally Unique Temporary Identity (5G-GUTI), Security parameters, Network Slice Selection Assistance Information (NSSAI), UE SGCN Capability, PDU session status, PDU session(s) to be re-activated and Mobile Initiated Connection Only (MICO) mode preference). In the case of a 5G-RAN, the AN parameters include e.g. SUPI or the 5G-GUTI, the Selected Network and NSSAI.

402 If a SUPI is included or the 5G-GUTI does not indicate a valid AMF 200 the RAN, based on the Radio Access Type and the NSSAI, if available, selects a new AMF 200.

404 The RAN transmits to the new AMF 200 an N2 message with the following information: N2 parameters and Registration Request. When a 5G-RAN is used, the N2 parameters include Location Information, Cell Identity and a RAT type related to the cell in which the UE is camping. If the Registration type indicated by the UE is a periodic registration update, then steps 406 to 432 may be omitted.

406 The new AMF 200 transmits to the old AMF an Information Request (complete Registration Request) message.

408 The old AMF transmits to the new AMF 200 an Information Response (SUPI, Mobility Management (MM) Context, SMF information).

410 The new AMF 200 transmits to the UE an Identity Request. If the SUPI is not provided by the UE nor retrieved from the old AMF the Identity Request procedure is initiated by the new AMF 200 by transmitting an Identity Request message to the UE.

412 The UE transmits to the new AMF an Identity Response message including the SUPI.

414 The new AMF may decide to invoke an Authentication Server Function (AUSF). In that case, the new AMF 200 shall select an AUSF based on the SUPI.

416 The AUSF initiates authentication of the UE.

418 The new AMF 200 initiates NAS security functions.

420 The new AMF 200 transmits to the old AMF an Information Acknowledged message. If new AMF 200 has changed, the new AMF 200 acknowledges the transfer of the UE Mobility Management (MM) context. If the authentication/security procedure fails, then the Registration shall be rejected, and the new AMF 200 transmits a reject indication to the old AMF. The old AMF continues as if the Information Request was never received.

422 The new AMF 200 sends to the UE an Identity Request message. If a Permanent Equipment Identity (PEI) was not provided by the UE nor retrieved from the old AMF the Identity Request procedure is initiated by the new AMF 200 sending an Identity Request message to the UE to retrieve the PEI.

424 Optionally, the new AMF 200 initiates a UE (or Mobile Entity (ME)) identity check towards an equipment identity register (EIR).

426 If step 428 is to be performed, the new AMF, based on the SUPI, selects a unified data management (UDM).

428 The new AMF 200 initiates an Update Location procedure if one or more of the following occurs: the AMF 200 has changed since the last registration; there is no valid subscription context for the UE in the new AMF 200; the UE provides a SUPI that does not refer to a valid context in the new AMF 200; the UE registers to the same AMF 200 it has already registered to a non-3GPP access (i.e. the UE is registered over a non-3GPP access and initiates this registration procedure to add a 3GPP access). The new AMF 200 provides the access type it serves for the UE to the UDM and the access type is set to "3GPP access". The UDM stores the associated access type together with the serving AMF 200. This will cause the UDM to initiate a Cancel Location process to the old AMF corresponding to 3GPP access, if one exists. The old AMF removes the MM context and notifies all possibly associated SMF(s), and the new AMF 200 creates an MM context for the UE after getting the AMF related subscription data from the UDM.

430 The new AMF 200 selects a PCF 300 based on the SUPI.

432 The new AMF 200 transmits to the PCF 300 a UE Context Establishment Request (SUPI). The UE Context Establishment Request includes a request for NAS policy control data and identifies the user. The request for NAS policy control data may be transmitted to the PCF, for example, if the new AMF 200 has not yet obtained Access and Mobility policy for the UE or if the Access and Mobility policy in the new AMF 200 is no longer valid.

434 The NAS policy data determiner 314 of the PCF 300 determines the NAS policy control data based on the user's subscription to the network, wherein the NAS policy control data includes one or more authorization parameters, as defined herein.

436 The NAS policy data determiner 314 then controls the transmitter 302 to transmit the NAS policy control data to the new AMF 200. The NAS policy control data may be included in a UE Context Establishment Acknowledged message.

438 The new AMF 200 sends to the SMF an N11 Request. The N11 Request is sent in one or both of the following scenarios:
  If the AMF is changed, the new AMF 200 notifies each SMF of the new AMF 200 serving the UE. The AMF 200 verifies PDU session status from the UE with the available SMF information. In the case where the AMF has changed, it is assumed that the old AMF provides the available SMF information. The new AMF 200 requests the SMF to release any network resources related to PDU sessions that the UE indicated as not established.
  If the UE was in Mobile Initiated Connection Only (MICO) mode and the new AMF 200 has notified an SMF of the UE being unreachable and that the SMF needs not to send DL data notifications to the new AMF 200, the AMF 200 informs the SMF that the UE is reachable.

440 The SMF sends to the new AMF 200 an N11 Response. The SMF may decide to trigger e.g. UPF relocation. If the Registration type indicated by the UE is periodic registration update, then steps 442 and 444 may be omitted.

442 The old AMF transmits to the PCF 300 a UE Context Termination Request. If the old AMF previously requested a UE context to be established in the PCF 300, the old AMF terminates the UE context in the PCF 300.

444 The PCF 300 transmits to the old AMF a UE Context Termination Acknowledged message.

446 The new AMF 200 sends to UE a Registration Accept message with the following parameters: 5G-GUTI, Registration area, Mobility restrictions, PDU session status, NSSAI, Periodic registration update timer, Local Area Data Network (LADN) Information and accepted MICO mode.

448 The UE sends to the new AMF 200 a Registration Complete message to the AMF to acknowledge if a new 5G-GUTI was assigned.

Figure 5:
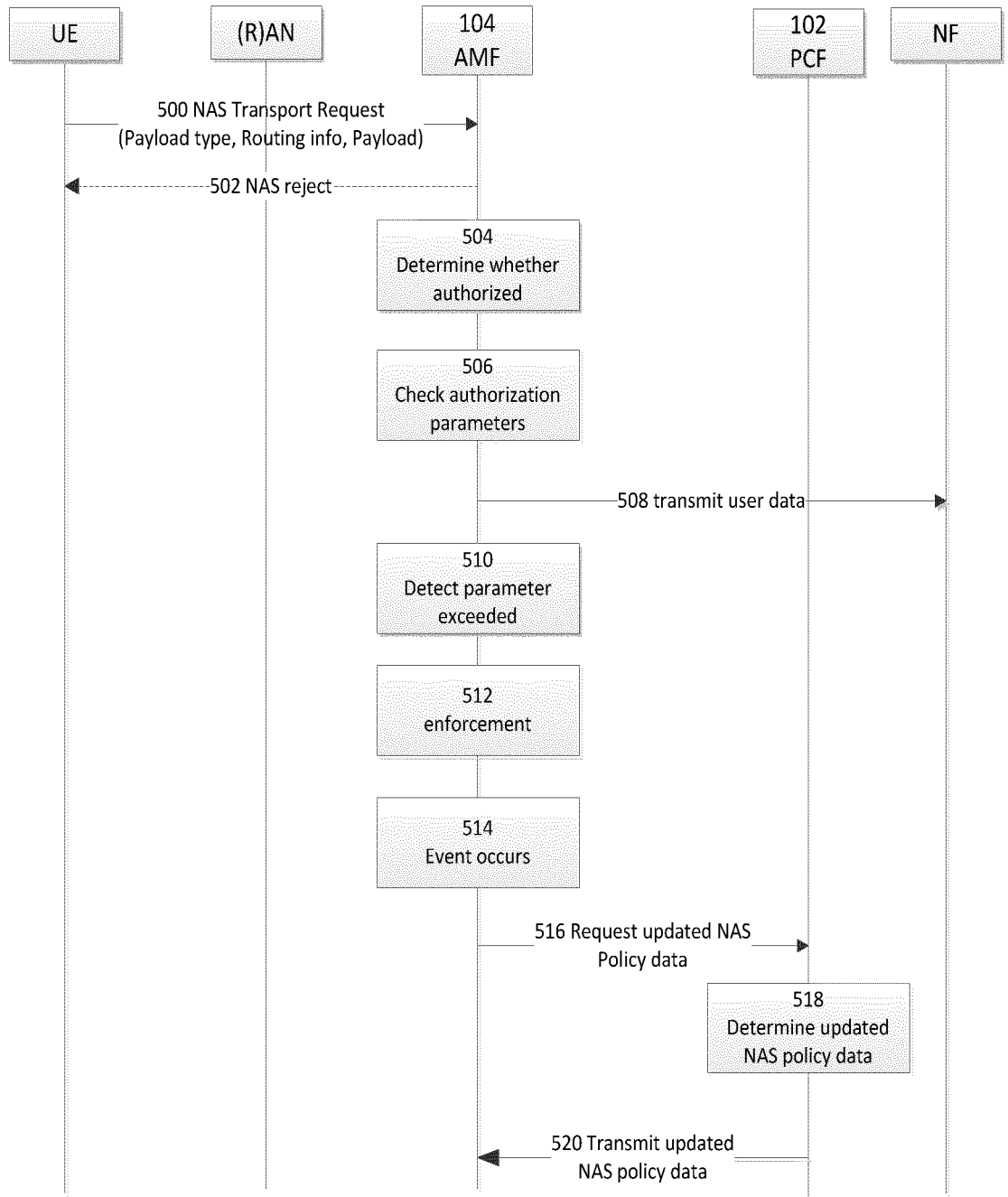
FIG. 5 is a signalling diagram showing authorization and control of the transmission of user data over the NAS.

FIG. 5 shows a signaling diagram for controlling user data transmitted over the NAS.

500 The AMF 200 receives a request from the UE (or AS) to transmit user data as part of the NAS transport (in 3GPP EPC, this procedure is defined in TS 23.401, clause 5.3.4B: Data Transport in Control Plane CIoT EPS optimization; the MME is playing the role of the AMF 104 in that case). The NAS transmission request at least identifies the user making the request. The NAS transmission request may also identify the payload type to be transmitted over the NAS, routing information and/or the payload itself.

502 If the user data cannot be transmitted over NAS because a general restriction prevents such transmission, the NAS transmission request is rejected and following steps are not carried out.

504 The NAS transmission authorizer 214 of the AMF 200 determines whether the NAS transmission request is authorized. In doing so, the NAS transmission authorizer 214 may check the received NAS policy control data to see whether the identified user is permitted to transmit user data over the NAS. In some exemplary arrangements, the NAS transmission authorizer may also check to see whether the user is authorized to transmit the identified payload type over the NAS and/or whether the identified user's maximum number of authorized NAS transmission requests has been exceeded.

506 If the NAS transmission request is authorized, the NAS transmission controller 216 of the AMF 200 checks the authorization parameters, such as the authorized rate at which the user may transmit user data over the NAS.

508 When applicable for a particular time and during the validity time of the NAS policy control data, the NAS transmission controller 216 controls the NAS transmission according to the authorization parameters. The NAS transmission controller 216 may control one or both of an UL and a DL transmission rate over the NAS for that UE.

510 In the exemplary method of FIG. 5, the NAS transmission controller 216 detects that an authorization parameter, such as the authorized rate for the UL and/or the DL is exceeded. It will be appreciated that this is an optional part of the process.

512 The NAS transmission controller 216 checks the enforcement actions received as part of the NAS policy control data and undertakes one or more of those enforcement actions:
  If redirection applies, the traffic will be redirected to a redirection address provided by the PCF 300 in the NAS policy control data or locally configured in the AMF 200;
  If packet discarding applies, the NAS transmission controller 216 will discard the user data;
  If a change in RAT Type or RFSP index applies, the NAS transmission controller 216 will indicate a specific radio access to allocate to the user data.

514 In arrangements in which the NAS policy control data comprises one or more event triggers, the event controller 218 monitors the transmission of user data over the NAS to determine whether one of the one or more events has occurred. It will be appreciated that this part of the process in FIG. 5 is optional.

516 If such an event occurs, the event controller 218 will control the transmitter 202 to transmit a request for updated NAS policy control data to the PCF 300. The request may comprise a UE Context Modification request.

518 The NAS policy updater 316 of the PCF 300 determines updated NAS policy control data based on the event that has occurred.

520 The NAS policy updater 316 then controls the transmitter 302 to transmit the updated NAS policy control data to the AMF 200, which may then use it to control subsequent transmission of user data over the NAS by the user.

In addition to the instructions provided as part of the Registration procedure, it is also possible that the PCF 300 requires the ingestion of traffic as part of the payload.

In some exemplary methods and apparatus, the NAS transmission controller 216 of the AMF 200 can control the transmitter 202 to transmit transmission parameters, such as the UL rate information to enforcement points that are closer to the origin of user data. That is, the NAS transmission controller 216 can transmit the information to the UE for enforcement of the UL user data and to the SMF 100 (when applicable) for DL user data enforcement. When a network function (NF) corresponds to the SMF 100, it is also possible to send the NAS policy control data to the SMF 100 as part of the registration procedure (e.g. step 22 in the registration procedure, TS 23.502, clause 4.2.2.2.2).

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A network node for use as an Access Mobility Function, AMF, for controlling a transmission of user data over a control plane of a telecommunications network via a non-Access Stratum, NAS, protocol, the network node comprising:
a receiver configured to:
receive NAS policy control data from a Policy Control Function, PCF, the NAS policy control data identifying a user, the NAS policy control data being based on a subscription to the telecommunications network, the subscription being associated with the user, the NAS policy control data comprising at least one authorization parameter identifying whether the user is permitted to transmit user data over the control plane via the NAS protocol; and
receive from one of a User Equipment, UE, and an Application Server, AS, an NAS transmission request identifying the user and requesting transmission of the user data over the control plane via the NAS protocol, the NAS transmission request including the user data for transmission; and
an NAS transmission authorizer configured to control whether the transmission of the user data over the control plane via the NAS protocol should be authorized based on the authorization parameters and the NAS transmission request.

2. The network node according to claim 1, wherein the authorization parameters comprise at least one of:
whether the user is permitted to transmit the user data over the control plane via the NAS protocol;
at least one payload type that the user is permitted to transmit over the control plane via the NAS protocol;
an authorized rate at which the user may transmit the user data over the control plane via the NAS protocol; and
a maximum number of authorized requests for the user.

3. The network node according to claim 2, wherein when the authorization parameters comprise at least one payload type that the user is permitted to transmit over the control plane via the NAS protocol, the NAS transmission request comprises data identifying a payload type to be transmitted, the NAS transmission authorizer being configured to authorize the NAS transmission request if the identified payload type is one of the at least one payload type in the authorization parameters.

4. The network node according to claim 2, wherein when the authorization parameters comprise the authorized rate at which the user may transmit the user data over the control plane via the NAS protocol, the network node further comprising an NAS transmission controller configured to control the transmission of the user data over the control plane via the NAS protocol based on the authorized rate.

5. The network node according to claim 4, wherein the authorized rate at which the user may transmit the user data over the control plane via the NAS protocol is at least one of a rate per Data Network Name, DNN, per Public Land Mobile Network, PLMN, and per network slice.

6. The network node according to claim 4, wherein the authorized rate at which the user may transmit the user data over the control plane via the NAS protocol comprises at least one of an uplink rate and a downlink rate.

7. The network node according to claim 1, wherein the NAS policy control data further comprises at least one enforcement action and wherein the NAS transmission authorizer is configured to undertake at least one of the at least one enforcement action if at least one of the authorization parameters is not met.

8. The network node according to claim 1, wherein the NAS policy control data further comprises at least one event trigger identifying at least one event, and wherein the network node further comprises an event controller configured to monitor transmission of the user data over the control plane via the NAS protocol and to control a transmitter to transmit to the PCF a request for updated NAS policy control data if one of the at least one event occurs.

9. A method for controlling a network node for use as an Access Mobility Function, AMF, for controlling a transmission of user data over a control plane of a telecommunications network via a non-Access Stratum, NAS, protocol, the method comprising:
receiving, by a receiver, NAS policy control data from a Policy Control Function, PCF, the NAS policy control data identifying a user, the NAS policy control data being based on a subscription to the telecommunications network, the subscription being associated with the user, the NAS policy control data comprising at least one authorization parameters parameter identifying whether the user is permitted to transmit user data over the control plane via the NAS protocol;
receiving, by the receiver from one of a User Equipment, UE, and an Application Server, AS, an NAS transmission request identifying the user and requesting transmission of the user data over the control plane via the NAS protocol, the NAS transmission request including the user data for transmission; and
controlling, by an NAS transmission authorizer, whether the transmission of the user data over the control plane via the NAS protocol should be authorized based on the authorization parameters and the NAS transmission request.

10. The method according to claim 9, wherein the authorization parameters comprise at least one of:
whether the user is permitted to transmit the user data over the control plane via the NAS protocol;
at least one payload type that the user is permitted to transmit over the control plane via the NAS protocol;
an authorized rate at which the user may transmit the user data over the control plane via the NAS protocol; and
a maximum number of authorized requests for the user.

11. The method according to claim 10, wherein when the authorization parameters comprise at least one payload type that the user is permitted to transmit over the control plane via the NAS protocol, the NAS transmission request comprises data identifying a payload type to be transmitted, and wherein the method further comprises authorizing, by the NAS transmission authorizer, the NAS transmission request if the identified payload type is one of the at least one payload type in the authorization parameters.

12. The method according to claim 10, wherein when the authorization parameters comprise the authorized rate at which the user may transmit the user data over the control plane via the NAS protocol, the method further comprises controlling, by an NAS transmission controller, the transmission of the user data over the control plane via the NAS protocol based on the authorized rate.

13. The method according to claim 12, wherein the authorized rate at which the user may transmit the user data over the control plane via the NAS protocol is at least one of a rate per Data Network Name, DNN, per Public Land Mobile Network, PLMN, and per network slice.

14. The method according to claim 12, wherein the authorized rate at which the user may transmit the user data over the control plane via the NAS protocol comprises at least one of an uplink rate and a downlink rate.

15. The method according to claim 9, wherein the NAS policy control data further comprises at least one enforcement action and wherein the method further comprises undertaking, by the NAS transmission authorizer, at least one of the at least one enforcement action if at least one of the authorization parameters is not met.

16. The method according to claim 9, wherein the NAS policy control data further comprises at least one event trigger identifying at least one event, and wherein the method further comprises:
monitoring, by an event controller, transmission of the user data over the control plane via the NAS protocol; and
controlling, by the event controller, a transmitter to transmit to the PCF a request for updated NAS policy control data if one of the at least one event occurs.

17. A network node for use as a Policy Control Function, PCF, in a telecommunications network, the network node comprising:
a receiver configured to receive from an Access Mobility Function, AMF, a request for non-Access Stratum, NAS, policy control data, the request identifying a user of the telecommunications network; and
a NAS policy data determiner configured to determine the NAS policy control data based on a subscription to the telecommunications network, the subscription being associated with the user, the NAS policy control data identifying the user and comprising at least one authorization parameter identifying whether the user is permitted to transmit user data over a control plane of the telecommunications network via a NAS protocol, the user data being included in a NAS transmission request, the NAS policy data determiner being further configured to control a transmitter to transmit the determined NAS policy control data to the AMF.

18. The network node according to claim 17, wherein the NAS policy data determiner is further configured to determine the NAS policy control data based on at least one dynamic condition.

19. The network node according to claim 18, wherein the dynamic conditions comprise at least one of:
- a time at which the user data may be transmitted over the control plane via the NAS protocol;
- a Radio Access Technology, RAT, type; and
- a load on the telecommunications network.

20. The network node according to claim 17, wherein the at least one authorization parameter comprises at least one of:
- whether the user is permitted to transmit the user data over the control plane via the NAS protocol;
- at least one payload type that the user is permitted to transmit over the control plane via the NAS protocol;
- an authorized rate at which the user may transmit the user data over the control plane via the NAS protocol; and
- a maximum number of authorized requests for the user.

21. The network node according to claim 20, wherein the authorized rate at which the user may transmit the user data over the control plane via the NAS protocol is at least one of a rate per Data Network Name, DNN, per Public Land Mobile Network, PLMN, and per network slice.

22. The network node according to claim 20, wherein the authorized rate at which the user may transmit the user data over the control plane via the NAS protocol comprises at least one of an uplink rate and a downlink rate.

23. The network node according to claim 17, wherein the NAS policy control data further comprises one or more enforcement actions to be undertaken if at least one of the authorization parameters is not met.

24. The network node according to claim 17, wherein the NAS policy control data further comprises at least one event trigger identifying at least one event, and wherein the receiver is configured to receive a request for updated NAS policy control data if at least one of the at least one event occurs, the network node further comprising an NAS policy updater configured to determine updated NAS policy control data based on the occurred event, and further configured to control the transmitter to transmit the updated NAS policy control data to the AMF.

25. A method for controlling a network node for use as a Policy Control Function, PCF, in a telecommunications network, the method comprising:
- receiving, by a receiver from an Access Mobility Function, AMF, a request for non-Access Stratum, NAS, policy control data, the request identifying a user of the telecommunications network;
- determining, by a NAS policy data determiner, the NAS policy control data based on a subscription to the telecommunications network, the subscription being associated with the user, the NAS policy control data identifying the user and comprising at least one authorization parameter identifying whether the user is permitted to transmit user data over a control plane of the telecommunications network via a NAS protocol, the user data being included in a NAS transmission request; and
- controlling, by the NAS policy data determiner, a transmitter to transmit the determined NAS policy control data to the AMF.

26. The method according to claim 25, further comprising determining, by the NAS policy data determiner, the NAS policy control data based on at least one dynamic condition.

27. The method according to claim 26, wherein the dynamic conditions comprise at least one of:
- a time at which the user data may be transmitted over the control plane via the NAS protocol;
- a Radio Access Technology, RAT, type; and
- a load on the telecommunications network.

28. The method according to claim 25, wherein the at least one authorization parameter comprises at least one of:
- whether the user is permitted to transmit the user data over the control plane via the NAS protocol;
- at least one payload type that the user is permitted to transmit over the control plane via the NAS protocol;
- an authorized rate at which the user may transmit the user data over the control plane via the NAS protocol; and
- a maximum number of authorized requests for the user.

29. The method according to claim 28, wherein the authorized rate at which the user may transmit the user data over the control plane via the NAS protocol is at least one of a rate per Data Network Name, DNN, per Public Land Mobile Network, PLMN, and per network slice.

30. The method according to claim 28, wherein the authorized rate at which the user may transmit the user data over the control plane via the NAS protocol comprises at least one of an uplink rate and a downlink rate.

31. The method according to claim 25, wherein the NAS policy control data further comprises at least one enforcement actions to be undertaken if at least one of the transmission parameters is not met.

32. The method according to claim 25, wherein the NAS policy control data further comprises one or more event triggers identifying one or more events, the method further comprising:
- receiving, by the receiver, a request for updated NAS policy control data if at least one of the at least one event occurs;
- determining, by an NAS policy updater, updated NAS policy control data based on the occurred event; and
- controlling, by the NAS policy updater, the transmitter to transmit the updated NAS policy control data to the AMF.

* * * * *